United States Patent
Navon et al.

(10) Patent No.: US 7,085,422 B2
(45) Date of Patent: Aug. 1, 2006

(54) LAYER BASED COMPRESSION OF DIGITAL IMAGES

(75) Inventors: Yaakov Navon, Ein Vered (IL); Alexander Nisenboim, Kiriyat Bialik (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/082,035

(22) Filed: Feb. 20, 2002

(65) Prior Publication Data

US 2003/0156760 A1 Aug. 21, 2003

(51) Int. Cl.
*G06K 9/36* (2006.01)

(52) U.S. Cl. ..................................................... 382/237

(58) Field of Classification Search ............... 382/232, 382/233, 234, 237, 239, 240; 375/240.01, 375/240.12; 358/3.01, 3.07, 3.08, 3.21, 426.13, 358/426.14, 465, 466, 467, 496; 348/390.1, 348/396.1, 397.1, 399.1

See application file for complete search history.

(56) References Cited

U.S. PATENT DOCUMENTS

| 4,194,221 A | * | 3/1980 | Stoffel .................... 358/3.08 |
| 4,251,837 A | * | 2/1981 | Janeway, III ............. 358/3.21 |
| 4,288,821 A | * | 9/1981 | Lavallee et al. .......... 358/3.07 |
| 5,453,073 A | * | 9/1995 | Markoll .................... 600/14 |
| 5,767,911 A | * | 6/1998 | Boon .................... 375/240.12 |
| 5,892,847 A | * | 4/1999 | Johnson .................... 382/232 |
| 5,990,955 A | * | 11/1999 | Koz ...................... 375/240.01 |

* cited by examiner

*Primary Examiner*—Jose L. Couso
(74) *Attorney, Agent, or Firm*—Stephen C Kaufman (57) ABSTRACT

A method for image separation of an image, wherein the image includes pixels, and the method includes identifying kernels, whereby characteristics of the kernels are reflected by at least one of the following operators, $P(x-w,y)-P(x,y)>t$ AND $P(x+w, y)-P(x,y)>t$; or $P(x, y-w)-P(x,y)>t$ AND $P(x, y+w)-P(x,y)>t$; or $P(x+d, y+d)-P(x,y)>t$ AND $P(x-d, y-d)-P(x,y)>t$; or $P(x-d, y+d)-P(x,y)>t$ AND $P(x+d, y-d)-P(x,y)>t$, wherein the kernels include at least some of a first group of the pixels. The kernels are associated with a first layer, and pixels that are not associated with the first layer are classified as a second layer. The first layer may be text or graphics and the second layer may be a background. The first layer may be compressed with a high resolution compression technique and the second layer may be compressed with a high lossy compression technique.

21 Claims, 8 Drawing Sheets

LAYER BASED COMPRESSION OF DIGITAL IMAGES

FIELD OF INVENTION

The present invention relates generally to a method and apparatus for compression of digital images, and in particular, for layer based image compression.

BACKGROUND

In large organizations where huge amounts of documents are handled, there is a demand for compression of digital images. For example, banks store digital formats of checks. More than 200 million checks are written is USA every day, and some banks store the digital format of the checks on line for several months. Additionally, government offices store great quantities of official forms and documents. In order to decrease the size of the digital information, many of the documents are compressed. Compression of digital images decreases the required storage capacities and reduces the transmit times of the images.

In some instances, images may comprise different types of information, such as, text and graphics. As such, the digital image may either be stored as a single image, or may be separated to several images, each image compressed and stored separately. There are various known in the art methods for image separation and compression, such as image segmentation and JPEG, respectively.

If the image is saved as a single image, it typically requires a lot of storage space. It is therefore desireable to save the original image as two or more separate images. However, techniques to separate text from graphics are less than optimal. Thus, there exists a need for improved image separation and compression tools.

SUMMARY

There is therefore provided, in accordance with an embodiment of the present invention, a method for image separation of an image, wherein the image includes pixels. The method includes the steps of identifying kernels, whereby characteristics of the kernels are reflected by at least one of the operators $P(x-w,y)-P(x,y)>t$ AND $P(x+w, y)-P(x,y)>t$; or $P(x, y-w)-P(x,y)>t$ AND $P(x, y+w)-P(x,y)>t$; or $P(x+d, y+d)-P(x,y)>t$ AND $P(x-d, y-d)-P(x,y)>t$; or $P(x-d, y+d)-P(x,y)>t$ AND $P(x+d, y-d)-P(x,y)>t$, wherein the kernels include at least some of a first group of the pixels. The kernels are associated with a first layer, and pixels that are not associated with the first layer, are classified as a second layer. The first layer may be text or graphics and the second layer may be a background.

Alternatively, the first layer is darker than the second layer, or conversely, the first layer is lighter than the second layer. In some embodiments, identifying kernels includes performing a binarization technique or performing text binarization. Identifying kernels may also include examining grey characteristics of pixels in an expansion of the kernels, wherein the expansion is less than or equal to 3 times w, wherein w is a typical stroke width of the image.

In some embodiments, the method further includes storing the first layer, and compressing the first layer with a high resolution compression technique. The method may further include compressing the second layer with a high lossy compression method.

There is therefore provided, in accordance with an embodiment of the present invention, a method of compressing an image having pixels. The method includes the steps of identifying four grey levels, wherein each of the four grey levels is mapped by an associated two bits, identifying per each the pixel an associated grey level, wherein the associated grey level is one of the four grey levels, storing per pixel, an associated pixel location and the associated grey level, and storing the mapping of each the four grey levels. The pixel location may be a mask image.

The method may also include dividing the image into tiles, and per tile, performing the steps of identifying, identifying, storing and storing.

There is therefore provided, in accordance with an embodiment of the present invention, a method of compressing an image having pixels. The method includes the identifying Y grey levels, wherein Y is greater than 2, wherein each of the Y grey levels is mapped by the root of Y associated bits and wherein the number of bits is $\log_2 Y$. The method further includes identifying per each the pixel an associated grey level, wherein the associated grey level is one of the Y grey levels, storing per pixel, an associated pixel location and the associated grey level, and storing the mapping of each the Y grey level. In some embodiments Y is 2 and the number of bits is 1.

There is therefore provided, in accordance with an embodiment of the present invention, a method including the steps of identifying first and second image content; and separately compressing the first and second image content. The first and second content may include image foreground and image background. A higher quality compression technique may be used to compress the foreground content, as compared to the compression technique used to compress the background content.

There is therefore provided, in accordance with an additional embodiment of the present invention, a system for separating an image, the system including a scanner, a processor and a memory. The scanner may create a digital image. The processor may separate the digital image into a first and second layer, and compress the first layer with a first compression technique and the second layer with a second compression technique. The memory may store the compressed first and second layers.

The processor may include a means for identifying kernels reflected by at least one of the operators selected from the group consisting of: $P(x-w,y)-P(x,y)>t$ AND $P(x+w, y)-P(x,y)>t$; and $P(x, y-w)-P(x,y)>t$ AND $P(x, y+w)-P(x, y)>t$; and $P(x+d, y+d)-P(x,y)>t$ AND $P(x-d, y-d)-P(x,y)>t$; and $P(x-d, y+d)-P(x,y)>t$ AND $P(x+d, y-d)-P(x,y)>t$; and associating the kernels with the first layer. The means for identifying may be a text binarization tool. The processor may also include a compression means for compressing the first layer with a high resolution compression technique.

The processor may include a compression means for compressing the second layer with a high lossy compression method. The processor may include restoration means for creating a restored digital image from the compressed first and second layer. The compressed first layer may include a binary mask of the foreground layer, compressed grey level foreground layer data, and quantization grey levels. The compressed grey level foreground layer data may be stored a two bit buffer or a one bit buffer. The quantization grey levels may include four levels or two levels.

There is therefore provided, in accordance with an additional embodiment of the present invention, a computer software product, including a computer-readable medium in which program instructions are stored, which instructions when read by the computer, separates an image into a first and second layer, and compresses the first layer with a first compression technique and the second layer with a second compression technique.

BRIEF DESCRIPTION OF FIGURES

The present invention will be understood and appreciated more fully from the following detailed description taken in conjunction with the appended drawings in which.

DETAILED DESCRIPTION

One embodiment of the present invention is a method and apparatus for layer based compression of digital images. One element of the present invention describes separating an image into two layers, a foreground and a background. In some embodiments, the foreground may be a text layer.

The present inventors discovered that not all the data in an image are of equal importance. Some of the data may be more important than other data. As an example, in a check, the foreground or text (date, amount, signature. etc.) may be more important than the background of the check. Hence, when compressing and storing the check image, and later restoring the check image from the compressed data, it may be more crucial for high quality restoration of the text, than for exact restoration of the background.

One element of the present invention therefore describes method and apparatus for compressing the foreground and the background separately, typically with the foreground stored with a higher quality compression method than the background. In one embodiment of the present invention, the foreground may be compressed with an almost non-lossy compression method, and the background may be compressed with a high lossy compression method.

In particular, it is quite usual that the foreground requires high quality, high resolution shape information. However, the value of greyness is not crucial for the good quality of the restored image. Hence, coarse quantizers can be applied in order to save space. For the background, the opposite approach may be much better; there, low resolution may be tolerated. However, since fidelity of greyness is of importance, fine quantizers must be used. Moreover, since foreground and background tend to be different in nature, it may happen that even for a given compression ratio, different algorithms should be used for each of these two image segments.

An additional element of the present invention describes a method for compressing the foreground of an image.

In an embodiment of the present invention, the following data may be stored for each image. The stored data may then be used for the restoration of the image.

1. A binary mask of the foreground layer (described in connection to FIGS. 1 4).
2. Grey level foreground layer data compressed into a two bit or a one bit buffer (described in relationship to FIG. 5).
3. Quantization grey levels for each tile four levels for two bit compression, and two levels for one bit compression (described in relationship to FIG. 5).
4. A compressed background layer (described in relationship to FIGS. 1 4)

It is noted that each above point is described in detail hereinbelow.

Figure 1:
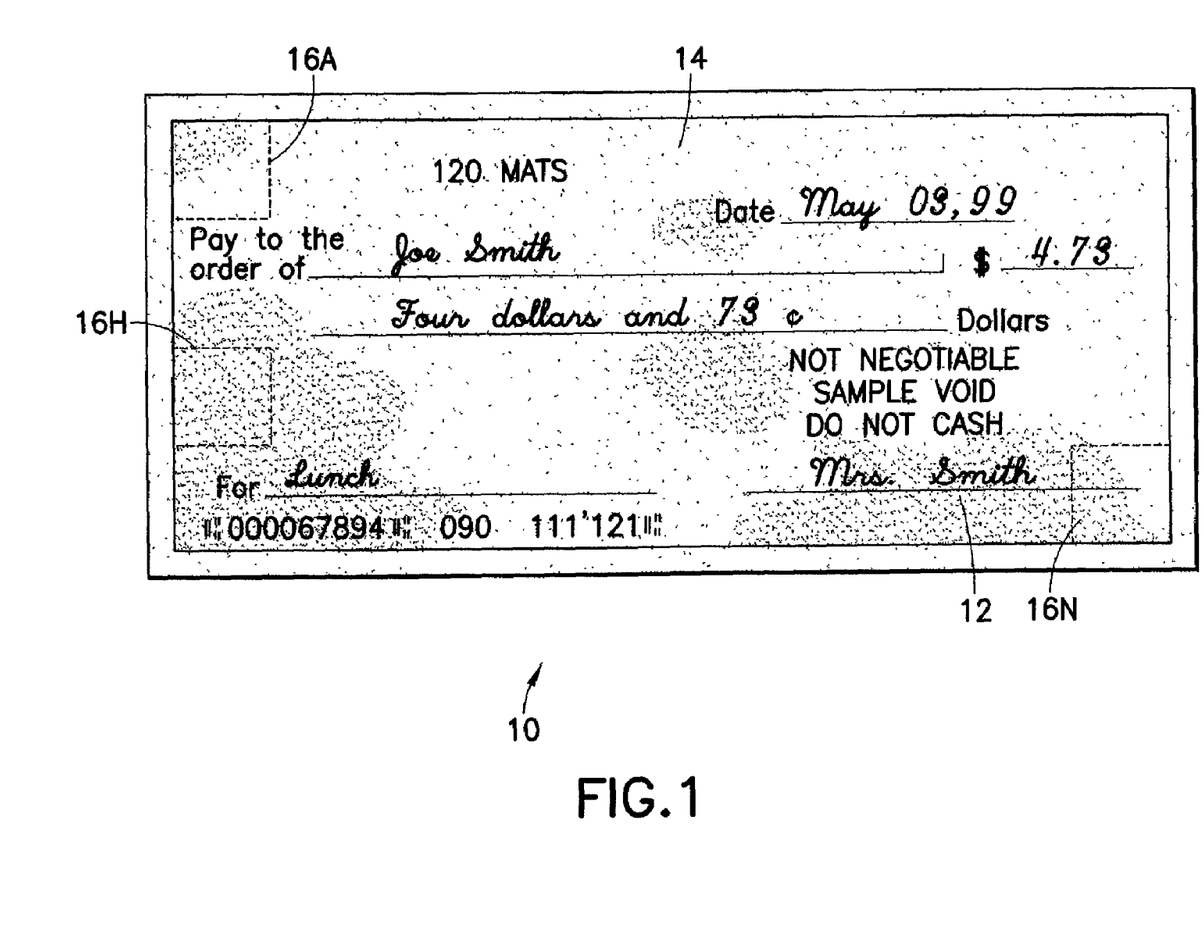
FIG. 1 is an illustration of a multi-layer compressed grey image.
Figure 2A:
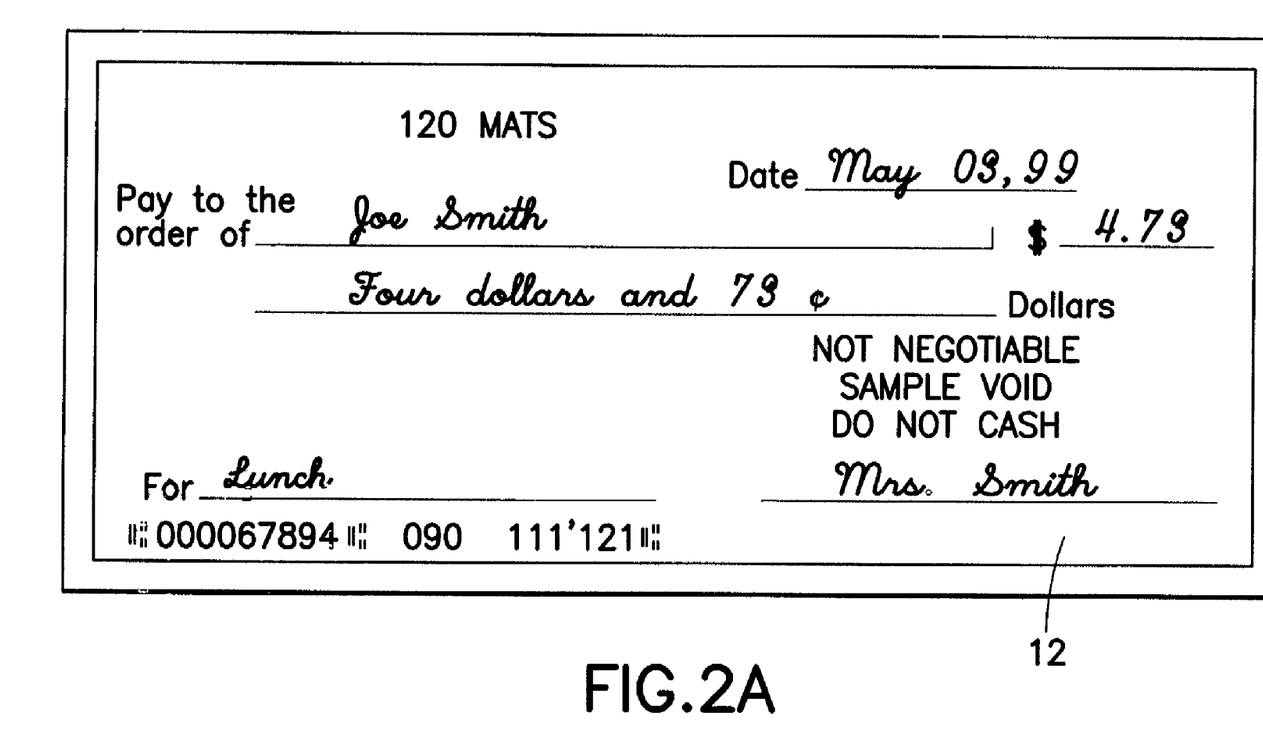
FIGS. 2A and 2B are illustrations of a foreground and a background layer, respectively, constructed and operative in accordance with a preferred embodiment of the present invention.
Figure 2B:
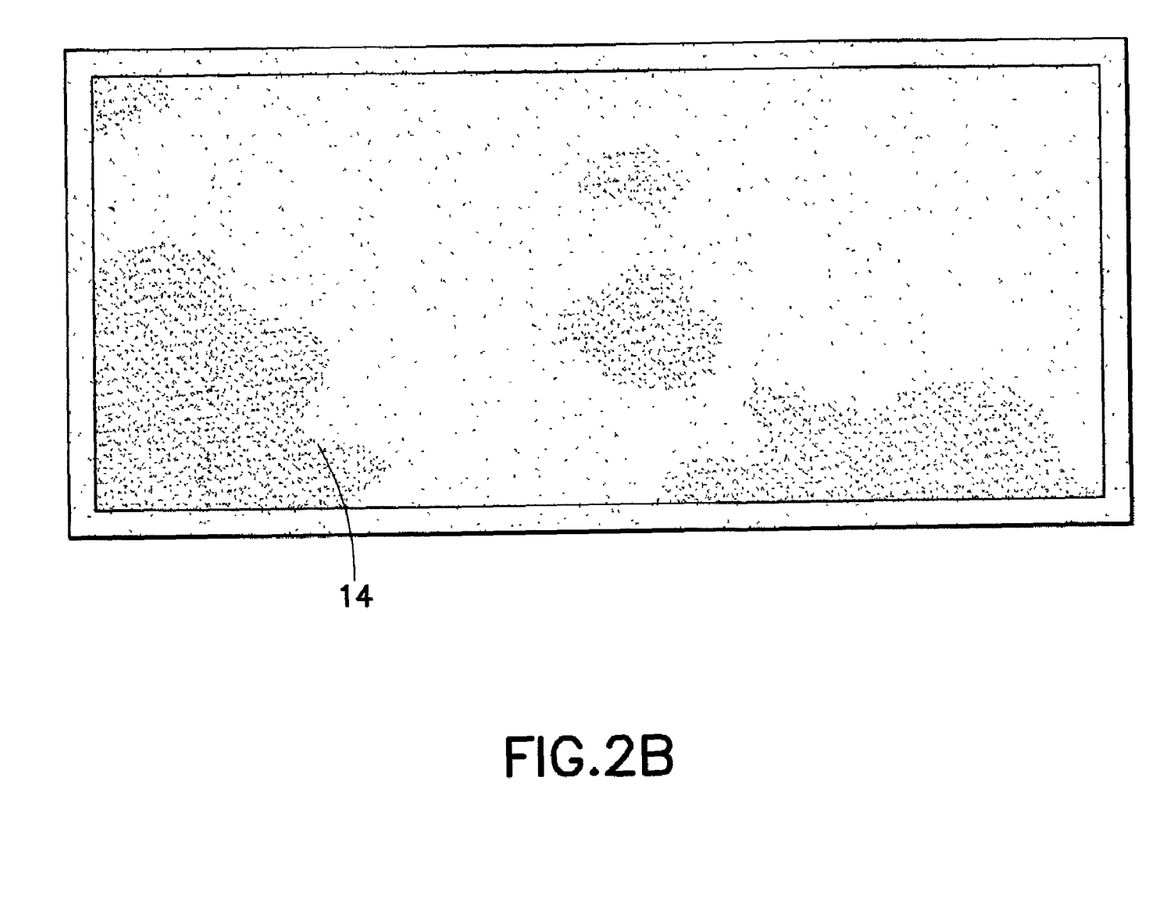

Reference is now made to FIGS. 1, 2A and 2B, illustrations of a multi-layered image 10, a foreground 12 and a background 14, respectively. Typically image 10 is a grey scale image, such as a check, or any other document comprising a first layer and a relatively lighter second layer, such as a background.

Image 10 herein may comprise foreground layer 12 and background layer 14. Typically foreground 12 may comprise text and graphics. The text and graphics may be relatively darker than background 14. Alternatively, the text and graphics may be relatively lighter than background 14.

Figure 3:
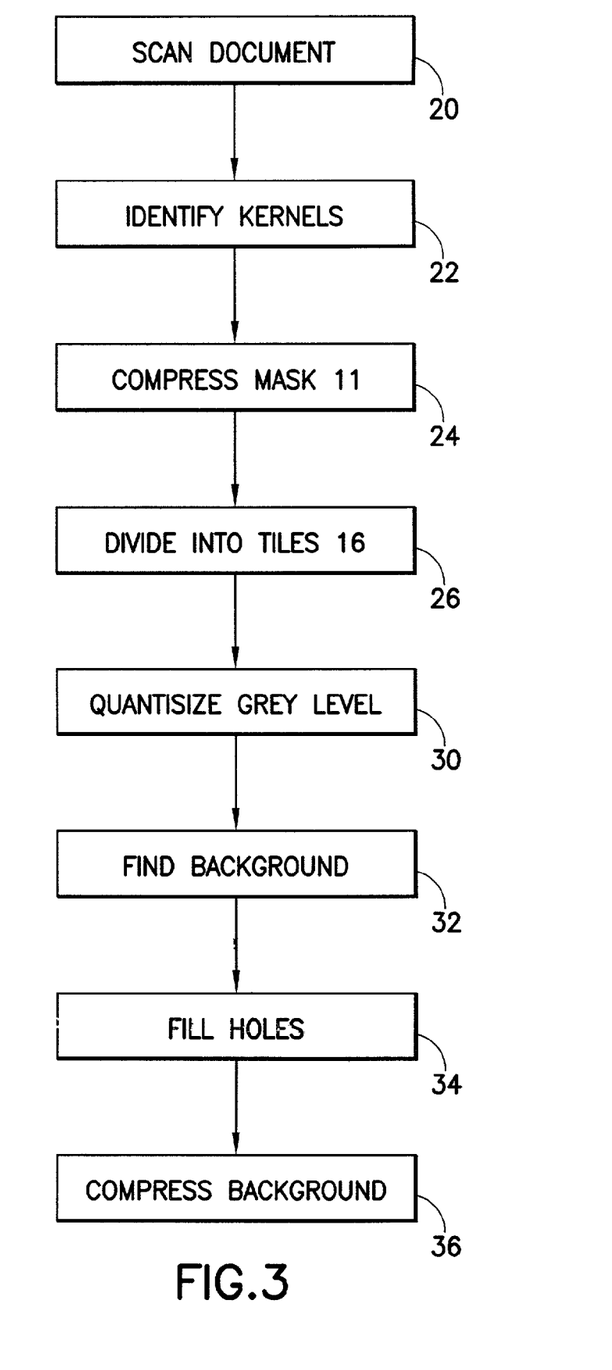
FIG. 3 is a flow chart of a layer separation method, operative in accordance with a preferred embodiment of the present invention.

Reference is now made in parallel to FIG. 3, a flow chart outlining an embodiment of the present invention wherein image 10 is separated in foreground 12 and background 14. It may be helpful to read the below flow explanation with reference to FIGS. 1 2B.

A document may be scanned (step 20), thereby creating digital grey scale image 10. As is known in the art, image 10 may comprise pixels, wherein the pixel grey level range is 1 byte per pixel. Alternatively, the pixel level range is 4 bits, or any other appropriate grey scale level.

The foreground 12 may be separated from the background 14. In the present embodiment, a method may be used such that the text kernels are first identified (step 22). A kernel may be defined as comprising pixels that have common characteristics, i.e., all the pixels have a grey level over a threshhold t are part of a kernel.

Figure 4:
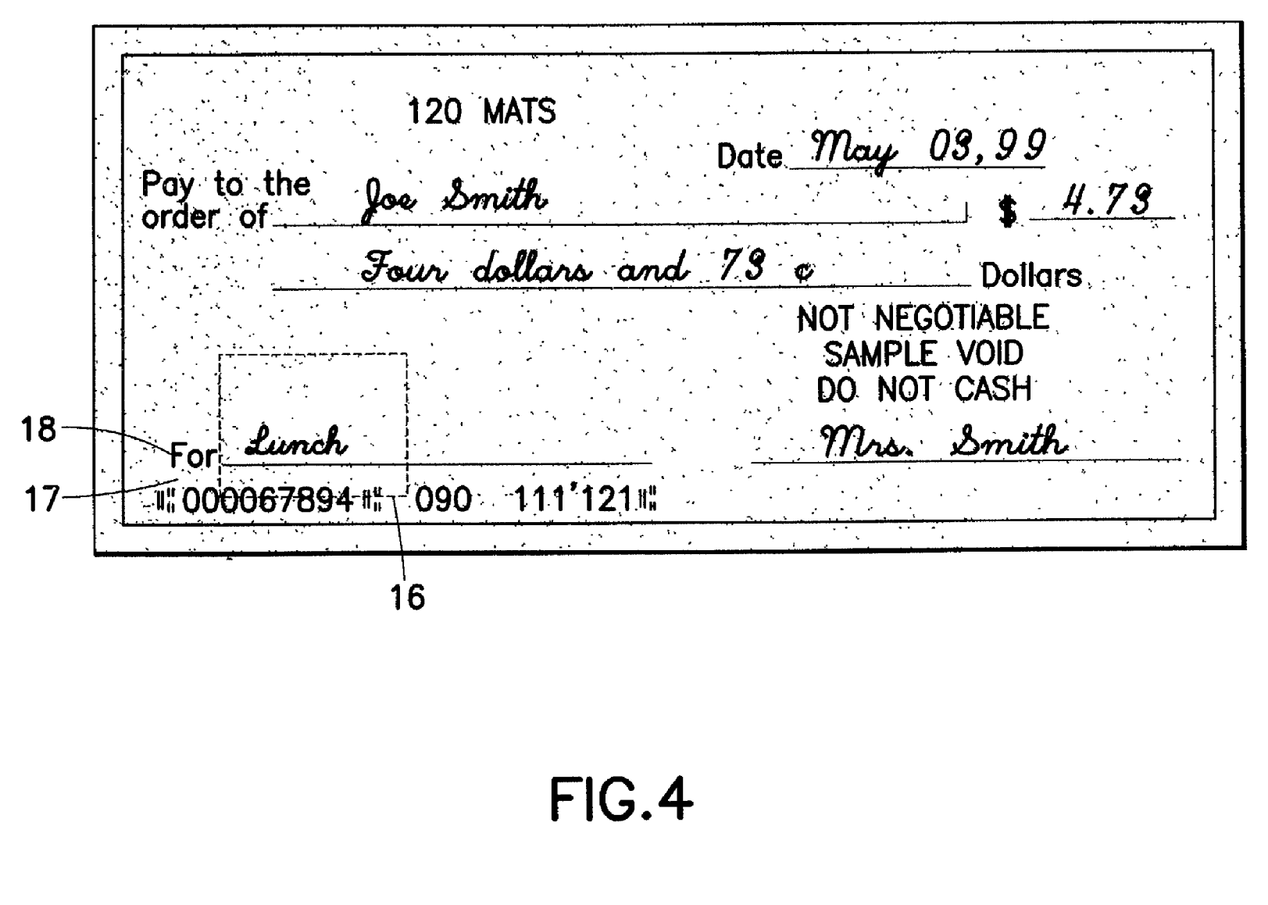
FIG. 4 is an illustration of a tile, constructed and operative in accordance with a preferred embodiment of the present invention.

Methods for identifying kernels are described below in reference to the below operators (1) (4) and FIG. 4. Once the text kernels are identified, pixels in the vicinity to the text kernels may also checked. If appropriate, they too may be classified as foreground 12.

It is noted that as may happen from time to time, pixels may be mis-classified as being text when they are not text, e.g. they are actually background 14, or vice versa. When compiling the foreground layer 12, these mix-classified pixels will appear as spikes. By morphology checks such pixels may be reset properly.

The identified kernels may then be complied into a binary mask 11 of foreground layer 12. The mask 11 of foreground layer 12 may then be completed by removing the spikes from mis-classified pixels. In some embodiments, in order to create the mask 11, dividing image 10 into multiple tiles may precede step 22.

In alternative embodiments, separation of the foreground from the background may be accomplished via standard binarization techniques. In some embodiments, binarization may be performed using alternative text binarization methods such as that described in U.S. patent application Ser. No. 09/210,327, Method of Binarization in an Optical Character Recognition System, assigned to a common assignee and included herein in as reference.

The mask 11 may then be compressed (step 24) by the any standard method (e.g. group 4, JBIG, JBIG2) and stored for the restoration step. In a conservative mode, in order to preserve foreground pixels for restoration, the mask 11 may be scaled down by two in the X direction.

Image 10 may be divided (step 26) into multiple tiles 16, labeled herein as tiles 16A to 16N. The size of tiles 16 is arbitrary, however, may typically be a size useful for compression purposes. It is noted that each tile 16 may have different characteristics and compression parameters. As an example, tile 16A may comprise more text, and thus have a relatively darker average grey level than the tile 16 next to it, or the average tile 16. Conversely, tile 16H may comprise more background, and thus have a relatively lighter average grey level than the average tile 16.

Figure 5:
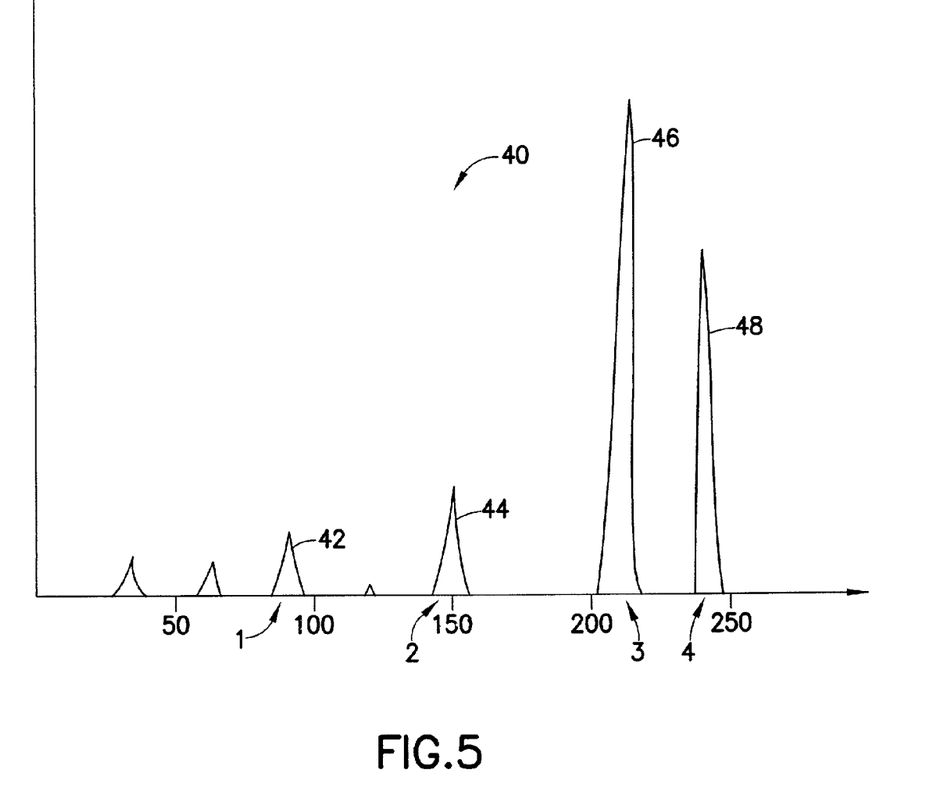
FIG. 5 is a histogram of a foreground image.

The grey level of the pixels in mask 11 may then be quantizied (step 30), compressed by a non-lossy method such as that described herein below in relationship to FIG. 5, and stored.

As a short mid-summary, it is noted that foreground 12 may comprise mask 11 (step 22) and grey level value of the pixel of the mask 11 (step 30); this correlates to items 1 and 2 from the list above.

By default, what is not the mask 11 is background 14 (step 32). When mask 11 is separated from image 10, holes may be left in the remaining image (background 14). These holes may be filled (step 34) with pixels having an average grey value equal to that of the background pixels in close vicinity to the holes.

Background 14 may then be compressed and stored (step 36) using various compression procedures, such as sub-sampling of the background layers. As an example, the scale down factor may be predefined to produce a required restored background quality. Alternatively, state of the art compression procedures such as JPEG, JPEG2000, etc. may be used. The compression rate may be set to produce a required restored quality. Yet further alternatively, the compression procedure may be a combination of sub-sampling and compressing of the sub-sample image by known compression procedures. It is noted that background 14 may have little to no contribution to the readability of the image textual content, and as such, relatively high lossy compression methods may be used.

The steps listed hereinabove may be performed for each tile 16, thus building the entire image 10.

In conclusion of the above discussion, it is therefore noted that the above described method may provide the ability to separate an image into 2 layers, compress each layer with a different compression method, and store appropriate layer data for future use in restoration of the image.

It is noted that separating the text from background figures is a difficult problem. Prior art separating solutions typically separated the image into layers of text, figures, background figures, background texture, etc. However, when text is written on a figured background, it is difficult for the prior art separation techniques to identify that part of the image that is text, and that part of the image that is the figured background.

The inventors of the present invention discovered that it is simpler to identify the relatively important data, the text, using text binarization like methods, and not attempt to identify the background, or less important layer. Therefore, as described above, the present invention identifies the text layer, and by default, the remaining image is the background layer.

Additionally noted, since it was so difficult for prior art methods to separate the text from the background figures, typically in prior art, the entire image is compressed with a single compression method. The inventors discovered that this procedure may waste valuable storage space and decreases readability in high compression rates, wherein, with the use of the present invention to separate important data (foreground) from less important data (background), it may be possible to store each layer using an appropriate compression method.

A method for identifying foreground 12 will now be explained. Typically foreground 12 may comprise text having typical morphology features of strokes that are relatively darker than background 14. The following operators that reflect those features of stroke are:

(1) $P(x-w,y)-P(x,y)>t$ AND $P(x+w, y)-P(x,y)>t$; OR
(2) $P(x, y-w)-P(x,y)>t$ AND $P(x, y+w)-P(x,y)>t$; OR
(3) $P(x+d, y+d)-P(x,y)>t$ AND $P(x-d, y-d)-P(x,y)>t$; OR
(4) $P(x-d, y+d)-P(x,y)>t$ AND $P(x+d, y-d)-P(x,y)>t$, wherein $P(x,y)$ is a pixel value at $(x,y)$, w is a typical stroke width, d is $w/2$ and t is a relative threshold (contrast). The stroke width d, and the relative threshold t, may be predefined or may be estimated from the input image. A detailed description of this method is included in patent U.S. patent application Ser. No. 09/210,327, Method of Binarization in an Optical Character Recognition System, assigned to a common assignee and included herein in as reference.

A pixel may be labelled as text if the relative threshold t of the pixel is darker than the background in a vicinity of a stroke width w. By applying one of above operators on the image pixels, most of the text pixels are correctly labelled as text. The text pixels are identified as belonging to foreground layer 12.

It is noted that similar operators can be used when the text is lighter than the background.

However, there may be remaining text pixels that the above technique does not recognize as text. These yet unrecognised text pixels may be labelled as text in the following procedure. To further understanding, it may be helpful to read this explanation together with FIG. 4, an illustration of an exemplary tile 16. In each tile 16, a grey level threshold 17 is defined from the grey levels of labelled text pixels 18. The pixels 18 in close vicinity to the text kernels, with grey level below threshold 17 are now labelled as text.

A method for compressing foreground 12 will now be described.

Normally, in grey scale images, the pixels grey level dynamic range is [0, 255] i.e. one byte per pixel. However, the local dynamic range of text pixels within a small area may be much smaller. Therefore, if the pixel level is quantized, pixels may be stored at less than one byte per pixel. The present invention describes alternative compression schemes, a two bit per pixel compression scheme and a one bit per pixel compression scheme.

Two Bit Per Pixel Compression Four Level Quantization

For each tile 16, a grey level histogram of pixels 18 in foreground 12 and background 14 is calculated. To aid this discussion, reference is now made in parallel to FIG. 5, an exemplary grey level histogram 40 of the pixels 18 in foreground 12 of exemplary tile 16A, constructed according to an embodiment of the present invention. Four dominant levels 42, 44, 46 and 48 are deduced from histogram 40. The levels 42 48 are assigned values; the lowest dominate level, level 42 is 0, e.g. [00]; level 44 is 1, e.g. [01]; level 46 is 2 e.g. [10]; and level 48 is 3 e.g. [11].

Using the nearest neighbour scheme, or alternative methods, pixels 18 may be mapped to one of the four dominant levels, as appropriate. As an example, pixels having a level of 190 may be mapped with dominant level 46 and given a value of 3.

The pixels 18 in exemplary tile 16 may then be stored in a buffer, 2 bit per pixel, thereby producing a compression ratio of 1:4. If higher compression rates are required, the buffer may be further compressed by any non-lossy method.

Additionally, the four dominant grey levels for each tile 16 may also stored. As such, for exemplary tile 16A, levels 96, 148, 210 and 240 may be stored representing dominant levels 42 48, respectively. Upon restoration, by referring to the stored levels, it is possible to restore pixels 18 to their original dominant grey levels. It is noted that the histogram for each tile 16 may be different, and hence, the dominant levels 42 48 may vary from tile to tile. The present method provides method and apparatus to store, and restore, each pixel for each tile with the appropriate grey level.

One Bit Per Pixel Compression Two Level Quantization

Alternatively, it may be desirable to store each pixel in one bit. The above 2 bit per pixel compression technique may be adapted to a two level quantization scheme. Thus, instead of 4 dominant levels with a 0 [00] 3 [11] range, the present scheme may have 2 dominant levels with a 0 [0] 1 [1] range. The mapping may be accomplished as follows:

Level 42 (e.g. 0) is mapped to 0 and level 48 (e.g. 3) is mapped to 1. Levels 44 and 46 (e.g. 1 and 2 respectively) may be mapped to 0 if pixel 18 is darker than its close neighbours. A pixel 18 is darker if it satisfies one of the operators noted above, where $P(x, y)$ is the two bit level [0–3], t is 0 and d is predefined and set close to a typical stroke width in the image. If pixel 18 does not satisfy the operator, it is mapped to 1.

The pixels 18 in the exemplary tile 16 may then be stored in a buffer, one bit per pixel. If higher compression rates are required, the buffers may be further compressed by any non-lossy method. Similar to the method above, for each tile 16, two actual grey scale levels are estimated from the histograms, and are stored for the restoration step.

Figure 6:
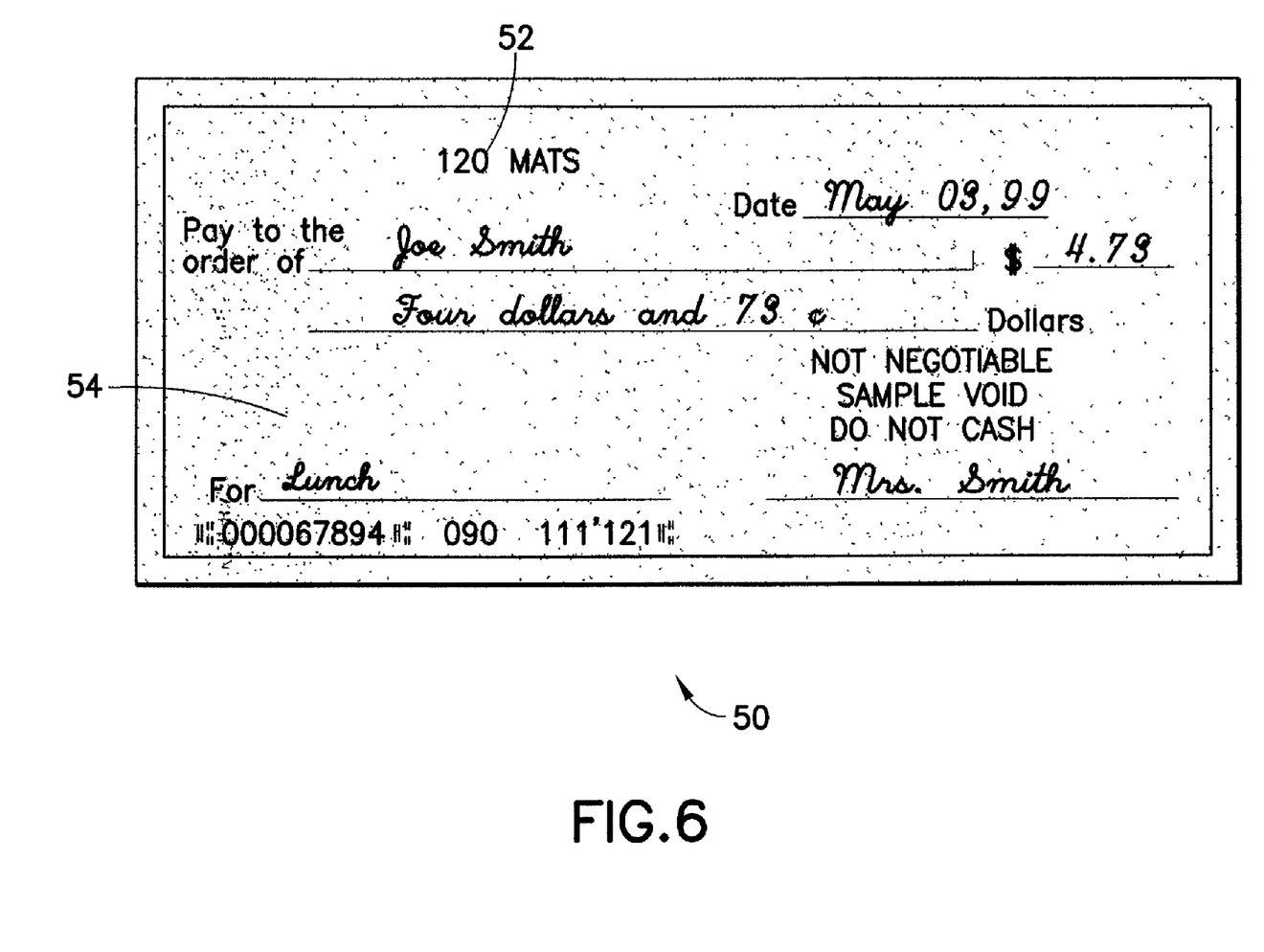
FIG. 6 is an illustration of an image restored from compression methods operative in accordance with a preferred embodiment of the present invention.

Reference is now made to FIG. 6 a restored image 50 of image 10. Restored image 50 may comprise a restored foreground layer 52 and a restored background layer 54. To reiterate information from the above, the stored data of image 10 may be:

1. A binary mask of the foreground layer
2. Grey level foreground layer data compressed into a two bit or a one bit buffer
3. Quantization grey levels for each tile; four levels for two bit compression and two levels for one bit compression.
4. A compressed background layer.

Foreground 52 is restored by inverse mapping of the stored values of items 1–3. The results may be a grey scale image of the foreground pixels only.

The restoration of the background 54 from item 4 depends on the chosen compressing procedure. If one of the conventional compression methods was used, then the decompression is straightforward. If sub-sampling was used, than the scale up may be done by any interpolation methods. Bilinear interpolation may give good results. Image 50 may then be restored by pasting the restored foreground layer 52 over the restored background layer 54. Finally, it may be useful to apply post-filter in order to smooth the difference between the foreground and background segments.

It is thus noted that the present invention may provide the use of two different compressions paths, for the foreground and the background, enabling high compression ratios, without readability penalties.

Additionally, the present invention may provide the quantization of the foreground levels by tiles, providing a more realistic dynamic range, which may produce a restoration closer to the original image. The textual parts in the restored image may be more realistic.

It is noted that in cases where the background is negligible, a synthetic background can be used. In such an instance, there may be no need to compress and to store the background, and so, a higher compression rate may be achieved. It is additionally noted that in images where the contrast is almost constant, the foreground layer may be found by any binarization tools.

In alternative embodiments, the space division may be done by connected components rather than by tiles. The foreground layer may be quantized and stored by connected components. In the restoration phase, the connected components may be recreated from the foreground mask image.

Figure 7:
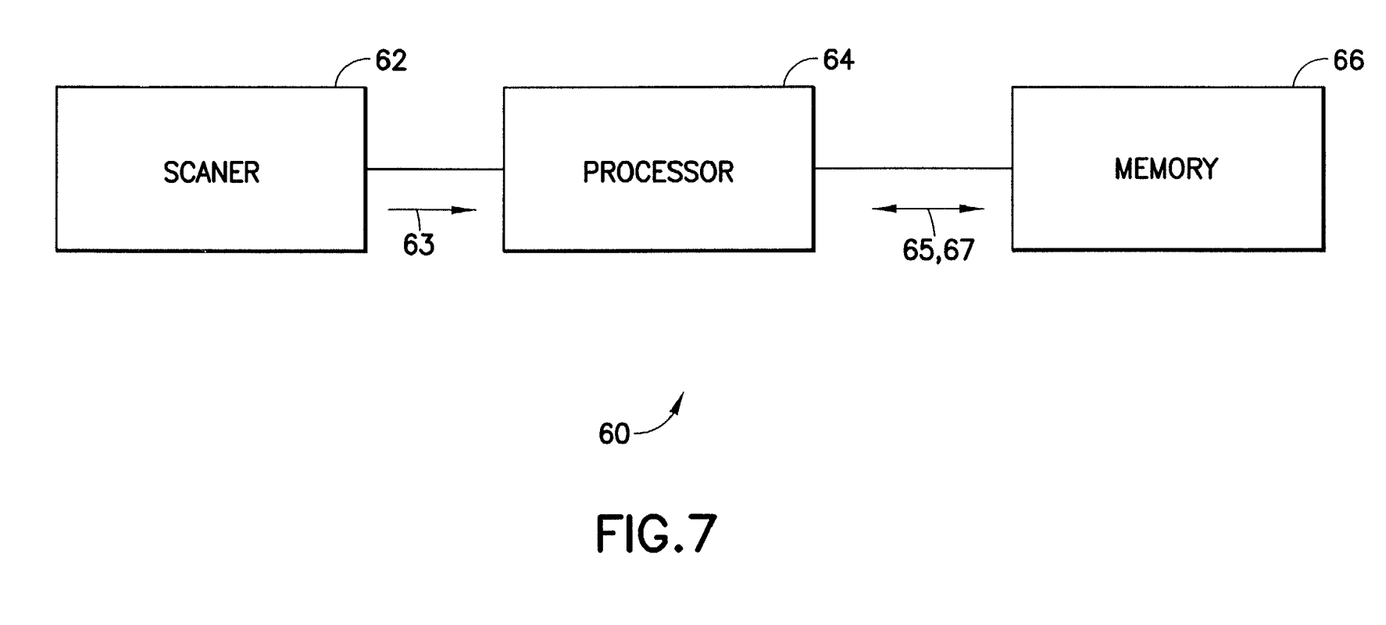
FIG. 7 is a block diagram of an image separation and storage system constructed and operative in accordance with a preferred embodiment of the present invention.

Reference is now made to FIG. 7, a block diagram of an image separation and storage system 60. System 60 may comprise a scanner 62, a processor 64 and memory 66. Scanner 62 may be used to create a binary image 63 of the image to be separated and stored. The binary image 63 may then be transmitted to processor 64, which may separate the binary image into a first layer 65 and a second layer 67, each layer may then be compressed as described in detail hereinabove.

First layer 65 may therefore comprise, as noted above, a binary mask of the foreground layer, grey level foreground layer data compressed into a two bit or a one bit buffer, quantization grey levels for each tile (four levels for two bit compression and two levels for one bit compression). Second layer 67 may comprise, as noted above, a compressed background layer. Layers 65 and 67 may then be transferred to memory 66 for storage.

Process 64 may further create a restored image from layers 65 and 67. Additionally, processor 64 may comprise user interface devices, such as a keyboard, screen, etc. (not shown). The screen may be used to display any of the images; either binary image 63, layers 65 and 67, and the restored image. Processor 64 may be used to monitor or control the processes, such as to request view of a specific image.

It will be appreciated by persons skilled in the art that the present invention is not limited by what has been particularly shown and describe herein above. Rather, the scope of the invention may be defined by the claims that follow:

The invention claimed is:

1. A method for image separation of an image, the image comprising pixels, the method comprising the steps of:
    identifying kernels reflected by at least one of the operators selected from the group consisting of: $P(x-w,y)-P(x,y)>t$ AND $P(x+w, y)-P(x,y)>t$ ; and $P(x, y-w)-P(x,y)>t$ AND $P(x, y+w)-P(x,y)>t$ ; and $P(x+d, y+d)-P(x,y)>t$ AND $P(x-d, y-d)-P(x,y)>t$ ; and $P(x-d, y+d)-P(x,y)>t$ AND $P(x+d, y-d)-P(x,y)>t$;
    associating said kernels with a first layer; and
    classifying as a second layer, said pixels which are not associated with said first layer.

2. The method of claim 1 wherein said first layer is a text or graphics.

3. The method of claim 1, wherein said second layer is a background.

4. The method of claim 1 wherein said first layer is darker than said second layer.

5. The method of claim 1 wherein said first layer is lighter than said second layer.

6. The method of claim 1, wherein identifying kernels comprises performing a binarization technique.

7. The method of claim 1, wherein identifying kernels comprises performing text binarization.

8. The method of claim 1, wherein identifying kernels comprises examining grey characteristics of pixels in an expansion of said kernels, wherein said expansion is less than or equal to 3 times w, wherein w is a typical stroke width of said image.

9. The method of claim 1, and further comprising the step of storing said first layer.

10. The method of claim 1 and further comprising the step of compressing said first layer with a high resolution compression technique.

11. The method of claim 1 and further comprising the step of compressing said second layer with a high lossy compression method.

12. A system for separating an image comprising:
a scanner for creating a digital image;
means for identifying kernels reflected by at least one of the operators selected from the group consisting of: $P(x-w,y)-P(x,y)>t$ AND $P(x+w, y)-P(x,y)>t$; and $P(x, y-w)-P(x,y)>t$ AND $P(x, y+w)-P(x,y)>t$; and $P(x+d, y+d)-P(x,y)>t$ AND $P(x-d, y-d)-P(x,y)>t$; and $P(x-d, y+d)-P(x,y)>t$ AND $P(x+d, y-d)-P(x,y)>t$; and associating said kernels with a first layer;
processor for separating said digital image into said first and second layer, and for compressing said first layer with a first compression technique and for compressing said second layer with a second compression technique; and
a memory for storing said compressed first and second layers.

13. The system of claim 12 wherein said means for identifying is a text binarization tool.

14. The system of claim 12, wherein said processor comprises a compression means for compressing said first layer with a high resolution compression technique.

15. The system of claim 12, wherein said processor comprises a compression means for compressing said second layer with a high lossy compression method.

16. The system of claim 12, wherein said processor comprises restoration means for creating a restored digital image from said compressed first and second layer.

17. The system of claim 12, wherein said compressed first layer comprises, a binary mask of the foreground layer, compressed grey level foreground layer data, and quantization grey levels.

18. The system of claim 17, wherein said compressed grey level foreground layer data is stored a two bit buffer.

19. The system of claim 17, wherein said compressed grey level foreground layer data is stored a one bit buffer.

20. The system of claim 17, wherein said quantization grey levels comprises four levels.

21. The system of claim 17, wherein said quantization grey levels comprises two levels.

* * * * *